United States Patent [19]
Mitchell

[11] 4,165,062
[45] Aug. 21, 1979

[54] MOLD WITH POROUS CAVITY VENT

[75] Inventor: John G. Mitchell, Fountain Valley, Calif.

[73] Assignee: California Injection Molding Co., Inc., Costa Mesa, Calif.

[21] Appl. No.: 869,059

[22] Filed: Jan. 13, 1978

[51] Int. Cl.$^2$ ............................................. B28B 17/00
[52] U.S. Cl. .................... 249/141; 249/142; 425/405 R; 425/420; 425/812
[58] Field of Search ............... 425/812, 405 R, 420, 425/577, 468, 546; 249/141, 63, 142, 135; 264/328, 97, 102

[56] References Cited

U.S. PATENT DOCUMENTS

| 2,378,586 | 6/1945 | Schultz | 249/142 X |
| 2,434,594 | 1/1948 | Schultz | 249/142 |
| 2,900,664 | 8/1959 | Hampel et al. | 425/420 X |
| 3,078,508 | 2/1963 | Martin, Jr. | 425/812 |

FOREIGN PATENT DOCUMENTS

| 211037 | 9/1960 | Austria | 425/577 |
| 1200518 | 9/1965 | Fed. Rep. of Germany | 425/812 |
| 2319592 | 11/1974 | Fed. Rep. of Germany | 425/812 |
| 1142877 | 9/1957 | France | 425/812 |
| 1462622 | 1/1977 | United Kingdom | 425/812 |

Primary Examiner—William R. Briggs
Attorney, Agent, or Firm—Gausewitz, Carr & Rothenberg

[57] ABSTRACT

A mold for injection molding of long thin walled articles has precisely balanced high-volume venting of a narrow cavity space surrounding a long slender cantilevered core and minimized flash. The venting is provided by closing an end of the female mold cavity with a sintered metal plug and forming an end of the mold cavity in an end face of the plug.

14 Claims, 3 Drawing Figures

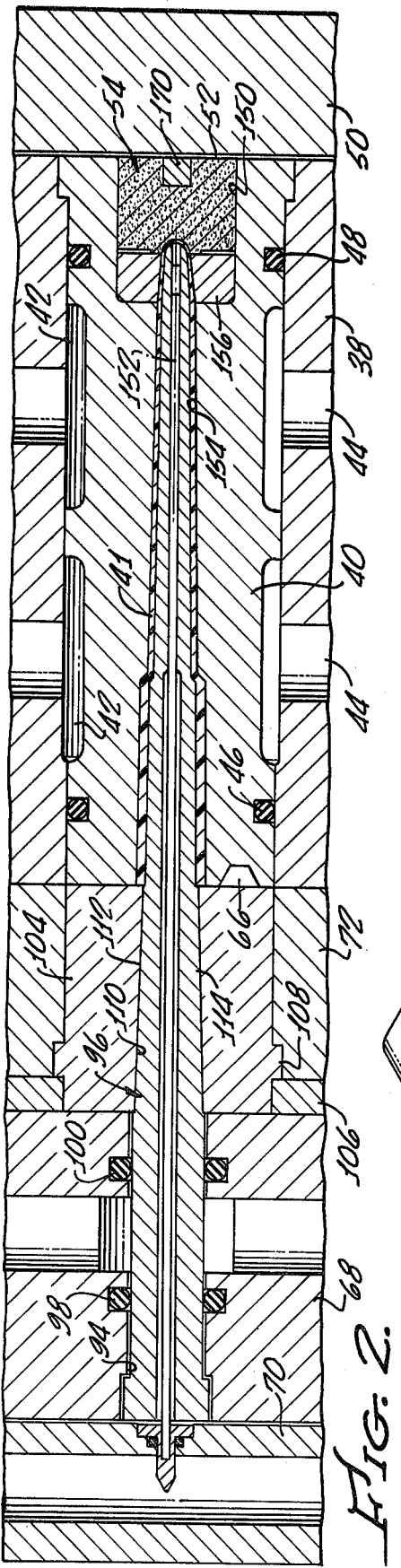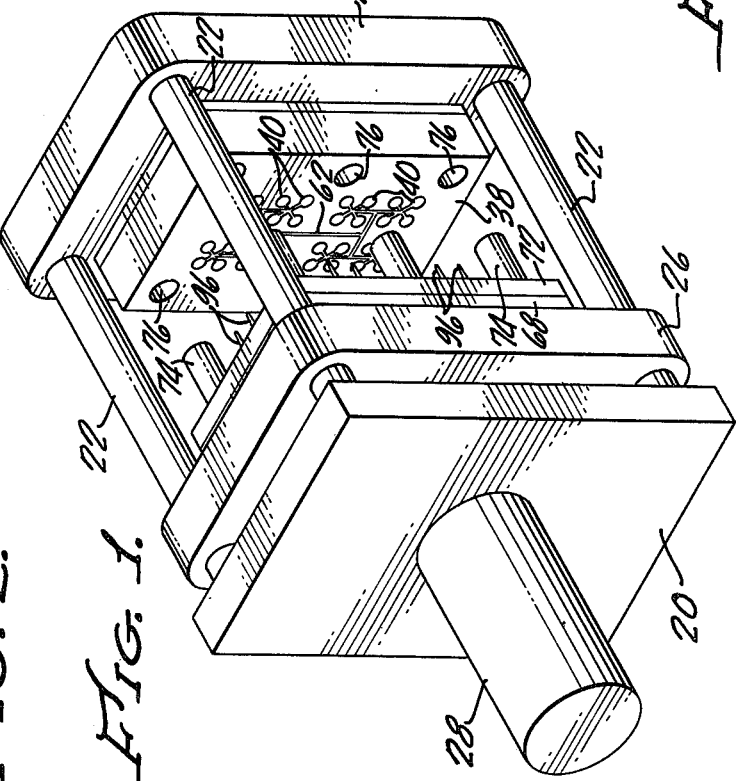

MOLD WITH POROUS CAVITY VENT

BACKGROUND OF THE INVENTION

This invention relates to molding and more particularly concerns balanced high-volume venting of a mold cavity.

Various types of elongated thin wall molded plastic articles are presently manufactured and used for many different purposes. Such articles include parts for ballpoint pens and various probe cover sheaths. A widely employed electronic digital thermometer embodies a probe for insertion into a body cavity where temperatures is to be measured. Removable probe sheaths, either disposable or sterilizable, are provided for ready attachment to and detachment from the thermometer probe. Particularly for disposable devices, it is important to maintain a low cost of the sheath. However, the tip of such a sheath must be exceedingly thin in order to provide a rapid heat transfer to the enclosed tip of the probe. Thus a number of prior probe covers have been made in two parts. Typical of such devices are those found in the U.S. pat. Nos. to Mack et al 2,983,385, Ensign et al 3,349,896, 3,500,280 and 3,367,186, Keller 3,469,449, Oudewaal 3,822,593 and VanDeWalker 3,719,396.

In a co-pending application of Russel T. Gilbert et al, Ser. No. 705,136 filed July 14, 1976 for Method and Apparatus for Molding Elongated Thin Wall Articles, there is described an unique method and apparatus for making thermometer probe covers which have a length of four inches, an average maximum diameter of considerably less than one-half inch, and a wall having a thickness measured in thousandths of an inch. The disclosure of such co-pending application is incorporated herein by this reference as though fully set forth. For commonly used injection molding materials, such as polyethylene, for example, heat characteristics that are required to obtain an acceptably short thermometer probe response time, dictate a wall thickness at the temperature sensing tip of the cover of no more than about 0.020 inches. Preferably the wall thickness of the tip is 0.010 inches.

Two major problems have provided obstacles to the molding of such thin wall covers as integral devices. These problems are the (a) maintaining of proper relative position of the long thin cantilevered core within a female mold cavity (the tip of the core must be symmetrically positioned within the cavity to provide an annular cavity space around the core of 0.010 inches) and (b) the attendant problem of adequately and uniformly venting cavity gases that are necessarily displaced during injection of the molding material.

In this type of manufacture, material at a temperature of approximately 480° F. is injected under pressures of many tons, typical injection pressures being significantly greater than 10,000 pounds per square inch. A slight departure from a circumferentially balanced condition of flow and pressure of the entering injected material exerts lateral forces on the long slim cantilevered core. These lateral forces cause the core to bend to an extent that makes the wall of the article unacceptably thin, or to an extent where the tip of the core contacts the side of the cavity and thus leaves a hole in the finished article.

In thermometer probes covers where the article is to be inserted into the human body, it is essential that there be no roughness, uneveness, or other irregularity on the outer surface of the article and especially upon its tip. It is partly for this reason that injection must occur at a point remote from the tip and that the core must be cantilevered, being entirely free at its tip to provide optimum smoothness at this portion of the finished article. Further, the venting, if it occurs at the tip, must be of such a nature as to leave little or no flash and little or no roughness on the tip of the finished article.

The significance of the problem of bending of the cantilevered core may be understood when it is noted that for an article having a wall thickness of 0.010 inches, deflection of the core tip of no more than 0.005 inches, can be tolerated. This is so because a commonly employed plastic cannot be forced to flow through a cavity space of less than 0.005 inches. Accordingly, if the core tip should deflect more than this amount in an arrangement for making articles having nominal wall thickness of 0.010 inches, the article tip cannot be formed because no plastic can reach this area. Nevertheless, a typical steel core, precisely positioned and aligned to be concentric with a cavity may deflect as much as 0.004 inches under forces exerted during conventional injection. This leaves the very difficult tolerance of 0.001 inches for the total of all other factors that contribute to errors in concentricity of core and cavity. Such other factors, in addition to core deflection, include initial centering of the core mounting, actual relative dimensions of the core and cavity diameters, clearance of the shank of the core at the mounting and the angle of the core axis (the degree of perpendicularity of the core). All of these other displacing factors must total not more than 0.001 inches where a common core pin is employed and where it may be expected to bend as much as 0.004 inches.

Another significant problem which contributes to the above-mentioned core deflection problem is adequately and symmetrically disposed venting. As the high pressure heated material is injected rapidly into the core space, defined between the female cavity and the male mold core, air witin the cavity must be rapidly exhausted. Accordingly, vents are provided to accommodate displacement of this air. Nevertheless, although the vents must be of such size as to allow escape of air, they must also prevent or minimize the flow of plastic therethrough. Any flow of the hot plastic through the vent holes causes undesirable flash. Thus venting passages of a size sufficient to handle a high rate of flow of the exiting gases must be provided and yet the venting orifices communicating with the space within the cavity must be sufficiently small.

Balanced venting is an aspect of great importance in the molding of thin wall articles. The venting must be precisely balanced about the cavity and about the core to insure that venting of the gases does not take place more rapidly at one side of the core than the other. If the gas vents more rapidly at one side, that side will fill more rapidly. This may result in one side of the cavity, on one side of the core, containing high pressure liquid injected material before any material has reached the other side of the core. Circumferentially unbalanced inflow of injected material will cause unacceptably large lateral and bending forces on the core and prevent formation of an acceptable molded article.

The method and apparatus of the above-identified co-pending application handles the problem of balanced venting by providing vent apertures at both the end of the cavity in the female mold part and by providing a venting bore through the entire length of the core. To maintain the vent apertures of sufficiently small individual size, vent pins are provided in the vent bores of both the cavity and the core itself to thereby provide an adequate volume of venting. However, these pins require high tolerance precision manufacturing techniques to insure that they are symmetrically positioned, since any asymmetrical positioning of the core pins will result in asymmetry of the venting and undesirable core deflection.

Porous material such as porous plastic and sintered metal, have been used in molds in the past, as shown in the U.S. Pat. Nos. to Kimura et al 3,804,566, Manning et al 3,329,198, Havens 3,254,981, Martin, Jr. 3,078,508, Garvey, Jr. 1,983,976, Carter 965,869 and Tanie 3,822,857. However, these patents do not show or suggest the molding of long thin wall articles and do not teach vent configurations sufficient to provide balanced high-volume venting at the tip of a long narrow cavity.

The patent to Schultz U.S. Pat. No. 2,378,586 shows a longitudinally split two-piece vent employed in the molding of hollow articles in which the two pieces collectively provide an aperture smaller than 0.003 inches for venting through the mold core. This configuration does not itself provide adequate balanced venting for manufacture of articles of the type described herein.

Accordingly, it is an object of the present invention to provide venting for a mold of the type described that is of sufficient volume and precision of balance to avoid or minimize problems of prior art devices.

SUMMARY OF THE INVENTION

In carrying out principles of the present invention in accordance with a preferred embodiment thereof, a mold having a female mold part with a long, small diameter closed-ended cavity and a male mold part having a long, slender cantilevered core that extends into the cavity in mold closed position to define a narrow cavity space between the core and the female mold part, is provided with improved means for establishing precisely balanced high-volume venting of the narrow cavity space without undue flash. Such venting means includes a bore formed in the closed end of the female mold part and precisely aligned and centered upon the axis of the cavity, and a porous plug seated in the bore, the plug having a recess formed therein that defines the end of the cavity so that the cavity space is vented omni-directionaly through the recess and the porous plug. According to another feature of the invention, the plug is formed of a sintered metal body and includes a boss projecting from an end face thereof, with the cavity end defining recess being formed in the boss. The area of the end face of the plug around the boss is spaced from the inner end of the bore whereby an enlarged path for vented gas is provided from the recess radially through the boss into the space between the inner end of the bore and the area of the sintered metal body end face that extends about the boss.

BRIEF DESCRIPTION OF THE DRAWINGS

FIG. 1 is a pictorial illustration of operative portions of a typical injection molding machine embodying principles of the present invention;

FIG. 2 is a cross-section of the mold showing the relative positions of a single female mold cavity, the male mold part and its mounted core and the interposed stripper ring; and FIG. 3 is a greatly enlarged cross-section of the cavity and showing the steel insert and the porous venting plug.

DETAILED DESCRIPTION

The present invention is employed with a conventional injection molding press with slightly modified molding parts. Details of the structure and operation of such a molding press are shown and described more fully in the above-identified co-pending application of Gilbert, et al. Thus only a brief description of such a press is provided at this point. As schematically illustrated in FIG. 1, the molding press includes a fixed support 20 mounted by suitable means (not shown) and rigidly secured by tie bars 22 to a stationary platen 24 of the press. The press includes a moving platen 26 which is adapted to slide on tie bars 22 when driven by an actuating means such as an hydraulic cylinder 28, having an associated driven piston rod that extends slidably through the support 20.

The side of the press incorporating the stationary platen 24 is normally the "hot side of the press." Such "hot side" incorporates the feed hopper for the plastic, the heating means for the plastic and the plastic extruder which forces hot plastic into the mold means to be described below.

A first or female mold part 38 is mounted to the stationary platen 24 and has fixedly mounted therein a plurality of mutually spaced identical and replaceable cavity-forming bodies 40 of which one is shown in the enlarged section of FIG. 2. These bodies are replaceable for ease of manufacture. In an exemplary embodiment of the present invention an injection molding press is made for simultaneously molding thirty-two probe covers and accordingly female mold part 38 is formed with thirty-two identical cavity-forming bodies 40. Each mold cavity body 40 is formed with a mold cavity having an interior configuration that precisely defines the exterior configuration of the article to be formed. In the exemplary mold described herein the article is a thermometer probe sheath 41 having a tapered shape of which the cross-section varies from point to point, as shown in FIG. 2.

Each body 40 is fixed to the female mold part 38 and has one or more circumferential channels 42 in communication with temperature controlling water passages 44 that are formed in the mold part 38. O-rings 46, 48 circumscribe each mold cavity body at opposite sides of the channels 42 to seal the body to and within the female mold part 38. The latter includes a back plate 50 fixed thereto and defining, together with the mold part 38, an air venting channel 52 that communicates with a porous vent body 54 to be described more particularly hereinafter, and also with the atmosphere.

Hot plastic injection material under high pressure is fed from an extruder (not shown) via a runner system 62 (FIG. 1) in communication with gating means for each of the mold cavities. The gating means for each mold cavity includes a runner 66 connected to the cavity (FIG. 2) and which extends slightly more than 180° around the cavity to provide precisely balanced inflow of injected molding material. Thus there is provided at the outer end of each cavity a material flow that is equal for each cavity and which is uniformly distributed about the circumference of each cavity.

The male mold part is mounted upon the movable platen 26 and includes a primary element 68 fixed to a movable back platen 70 and carrying a second element in the form of a shiftable stripper plate 72. Element 68 of the male mold part fixedly carries a plurality of leader pins 74 which are received in a plurality of bushings 76 of female mold part 38 as the two parts move to a closed position. Leader pins 74 also slidably extend into apertures (not shown) in the stripper plate 72, thus guiding motion of the stripper plate to and from the primary element 68 of the male mold part.

Mounted as a relatively loose but close fit within a plurality of bores 94 formed in the primary male element 68 are the rearward ends of a plurality of cores 96 which are resiliently and shiftable retained in position within the bores 94 by O-rings 98, 100. Each core is cantilevered from the male mold part and extends therefrom toward the female mold part, movable with the male mold part from mold open to mold closed position. In the mold closed position the core is fully inserted into the female mold part cavity as shown in FIG. 2.

In mold closed position the core is completely free of contact with the cavity walls and completely independent of any support from the cavity walls. Each core is precisely and accurately positioned to be concentric with its respective cavity by means of the stripped plate 72 which positions and locks the core when the parts are in mold closed position. The stripper plate has a plurality of core locking rings 104 that are retained in place by a plate 106 fixed to the stripper plate 72 and engaging collars 108 formed on each of the locking rings. Each locking ring 104 has a tapered bore 110 that precisely mates with a tapered outer surface 112 of a locking section 114 of a corresponding one of the cores 96. In mold open position the stripper ring relatively loosely surrounds the core, but as the parts move to mold closed position the stripper ring firmly, securely and precisely positions the core with respect to both of the mold parts.

Referring now to FIG. 3, cavity body 40 is formed with a bore 150 that is precisely aligned with and centered upon the longitudinal axis 152 of the female mold part cavity 154. The bottom of the bore contains a tool steel air impervious insert 156, made of the same tool steel as in the cavity body 40. Insert 156 is apertured, as at 158, to define a portion of the cavity close to but slightly spaced from the end of the cavity.

The end or tip of the cavity has a partly spherical configuration and is defined by a recess 160 that is formed in the end of a boss 162 that projects inwardly from the end face 164 of the vent plug 54.

Portions of the end face 164 of the plug 54 that surround boss 162 are axially spaced from the inner end of the cavity body bore 150 (which inner end is defined by the steel insert 156, when the latter is used). Thus a relatively large diameter cylindrical plug 56 is employed but its end face (adjacent the female mold part cavity) is so configured that only a relatively small area contacts the mold part adjacent the cavity and such area itself (boss 162) surrounds the cavity end, actually defining the cavity end. This configuration provides greatly increased venting area but employs greatly decreased amount of this relatively weak vent plug material immediately around the cavity, as will be more particularly described below.

Vent plug 54 is made of completely porous material which may be of the type described in patents identified above. It is presently preferred, however, to employ a sintered metal material known as K-316 of a 60% density, made by Kwikset Company of Garden Grove, Calif. Other materials having equivalent structural properties and equivalent porosity may be employed. Materials of other than 60% densities also may be used, it being understood that materials of sintered metals of higher density, such as densities up to 70%, would provide less surface roughness at the tip of the finished article while providing for somewhat decreased vent area. Various materials of density less than 60% would provide greater venting area, but with less structural integrity and greater surface roughness of the finished article.

The vent described herein as a sintered metal plug body is of a circular cylindrical configuration to precisely fit within the circular cylindrical bore 150 at the end of the mold cavity body 40. However, despite attempts to achieve exceedingly tight tolerances, diameters and concentricities of the bore 150 and the sintered metal plug body may vary slightly. Thus, in the manufacture and assembly of the vent plug to the body, the porous plug is inserted into the bore and rotated until a best fit of the plug within the body is achieved. With the parts in this position a groove 168 is formed across the end of the assembly, extending across the plug and across the end face of the body 40 on both sides of the porous plug. A key 170 is then inserted in the groove and locks the plug body to the cavity body, preventing relative rotation of the two about the axis 152. Thus the plug may be removed and later replaced to provide the same selected high tolerance and precision fit.

The described configuration of the sintered metal vent plug, having the end of the mold cavity formed as the recess 160 of the vent plug, maximizes the volume and rate of vented gases, and yet provides a configuration which insures structural integrity of the relatively soft and weak sintered metal body and, furthermore, insures a balanced flow of vented gases.

As can be seen in the enlarged view of FIG. 3, as the hot liquid plastic is injected into the cavity gas is being forced out of the elongated cavity 154 and is vented along paths indicated by the arrows. The entire tip of the cavity provides a nearly omni-directional venting surface to allow the gases to flow omni-directionally outwardly through the recess 160 and through the porous vent plug. The provision of the outwardly projecting boss 162 (in which the cavity recess 160 is formed) significantly enhances the flow area in the following manner. Gas is vented in all outward radial directions from the recess 160 in a multitude of radial paths, some of which, lying in a diametral plane of the cavity, have a short length and are indicated in FIG. 3 by arrows 180a and 180b, 182a and 182b. The path of flow of vent gas indicated by arrows 180 and 182 are relatively short, considerably shorter than the axial length of the plug and considerably shorter than any distance through the plug from the recess to a main surface of the plug. Gases flowing along the omni-directional transverse radial paths, such as the paths indicated by the arrows 180 and 182, flow into the annular space 184 that is defined by the end of the bore 150 (or more specifically by the end face of the steel insert 156 at the end of the bore) and the annular end face 164 of the vent body that circumscribes the boss. The surface area of the porous plug that is exposed to the annular space 184 between the plug and the insert 156 is relatively large (much larger than the area of recess 160) and and then greatly increases the amount of gas that can be vented from the recess through the porous plug body.

The pores through the sintered metal body are small and thus restrict flow of gas therethrough. It is the large quantity of such small pores that at once enables a large amount of gas to be vented and yet prevents flash. The described configuration still further enhances the amount of gas that can flow through the plug and yet maintains a maximum structural integrity of the sintered metal body. Thus a relatively large quantity of gas can flow through the radial paths indicated by arrows 180a and 180b and arrows 182a, 182b. Gas will flow omnidirectionally radially along such paths into the annular space 184 that surrounds the boss. The paths 180 and 182, being relatively short, will provide less restriction and accordingly increased flow into the space 184 from whence such increased flow may proceed through the relatively larger annular area of the plug adjacent the space 184. Of course, the gas flows outwardly through the plug recess in many other directions (other than directions of arrows 180, 182) as indicated by arrows 190 in FIG. 3.

Steel insert 156 may be omitted if deemed necessary or desirable and the bore 150 formed with a length substantially equal to the length of the sintered metal plug. However, it is presently preferred to employ the steel insert 156 to thereby facilitate repair and replacement of the mold parts forming this area of the cavity, and changes in cavity configuration.

The described position and configuration of the sintered metal plug, in which the end of the mold cavity itself is formed in the plug, provides a precisely symmetrical and balanced venting. Surprisingly and unexpectedly it is found that the described porous metal plug so greatly enhances the rate of venting and therefore the rate of injection of liquid molding material, that no other venting is required. Moreover, the arrangement permits such an improvement in symmetry and balance of the venting, and accordingly symmetry and balance of the input flow of the liquid injected material, that deflection of a cantilevered steel core caused by unbalanced input flow can be maintained at an acceptable value. The core need not be supported at its end nor need it be made of a material stiffer than steel.

Surprisingly and unexpectedly the use of the described sintered metal plug enables the molding of articles of still smaller diameter and smaller wall thickness. Smaller articles have significantly less mass (of plastic material) and less cross-sectional area whereby the injected molding material will cool at a much faster rate. For this reason it is more important for the molding of such smaller cross-section, long articles to increase the injection rate so that all of the material may flow from the injection gate to the end of the cavity before the material cools and freezes within the cavity space. However, it was found with prior techniques, including those described in the above-identified co-pending application, that injection rate was not sufficiently high for manufacture of still smaller articles. Surprisingly and unexpectedly, use of the described sintered metal plug for venting so greatly increased the rate of venting that the rate of fill of the cavity space with injected material was increased sufficiently to allow complete filling of the cavity space of such small article before the solidification or semi-solidification of injected material.

As an alternative configuration, it is contemplated that the end face 164 of the plug 54 has no boss, being completely planar except for the recess 160. A comparable boss is formed on the end of insert 156. Such boss on the insert provides the same function as the boss on the plug. It spaces the major (outer) part of the end face of the plug from the insert and provides short transverse radial paths to a relatively large annular surface of the porous plug from the relatively small surface of the recess 160.

The foregoing detailed description is to be clearly understood as given by way of illustration and example only, the spirit and scope of this invention being limited solely by the appended claims.

What is claimed is:

1. A mold for injection molding a long thin wall article comprising first and second mold parts mounted for relative motion between mold open and mold closed positions, said first mold part having a long slender cavity formed therein, said second part having a long slender core with an end extending into said cavity closely adjacent an end of said cavity, and a porous vent body mounted adjacent an end of said first mold part, said body having a portion with a recess that defines said end of said mold cavity and extends about said end of said cavity and at least partially about said core end.

2. The mold of claim 1 wherein said first mold part has an enlarged bore at an end thereof adjacent the end of said cavity, said body being positioned within said bore to define an end of said mold cavity, and means for venting said cavity through said body into said bore and from said bore comprising means for defining a space between said body portion and said first mold part.

3. The mold of claim 2 wherein said means for defining a space includes an impervious plug within said bore interposed between the bottom of said bore and portions of said body, said plug having outer areas spaced from said vent body.

4. The mold of claim 3 wherein said first mold part, impervious plug and vent body all have different adjoining sections of said mold cavity formed therein whereby said mold cavity is defined collectively by said vent body, said impervious insert and said first mold part.

5. The mold of claim 1 including means for providing a path for vent gas radially outwardly from said cavity end, said means comprising a boss projecting from an end face of said vent body, said end of said mold cavity being formed in said boss, and said end face being spaced from said first mold part, whereby said path for vented gas is provided from said cavity through said boss into the space between said end face and said first mold part.

6. The mold of claim 5 wherein said porous vent body is a sintered metal body.

7. The mold of claim 1 wherein said vent body is a sintered metal body having an end face, said recess being formed in said end face, areas of said end face adjacent to but spaced from said recess being spaced from said first mold part, whereby vent gases may flow radially through the end of said cavity and through portions of said end face into the space between said sintered metal vent body end face and the first mold part.

8. The mold of claim 7 wherein said sintered metal vent body has a length transverse to said end face not substantially less than the dimension of said sintered metal body measured in the plane of said end face.

9. The mold of claim 7 including means for restraining relative rotation of said vent body and said first mold part.

10. In a mold for injection molding a long thin wall article having a length several times greater than its diameter, said mold having a female mold part with a long, small diameter, closed ended cavity therein, and a male mold part mounted for movement along the axis of said cavity to and from the female mold part between mold open and mold closed positions, said male mold part having a long slender cantilevered core that extends into said cavity in mold closed position closely adjacent walls of said cavity but spaced from and completely unsupported by said cavity, to define a narrow cavity space between said core and said female mold part, improved means for providing precisely balanced, high volume venting of said narrow cavity space without undue flash comprising a bore formed in the closed end of said female mold part cavity, said bore being aligned with and centered upon the axis of said cavity, and means for flowing vent gas both radially and axially from said closed end of said female cavity comprising a porous plug mated with and seated in said bore, said plug having a recess therein that defines the end of said cavity, said core having an end at least partially within said recess.

11. The apparatus of claim 10 wherein said bore has a diameter greater than the diameter of said female mold part cavity and wherein said plug comprises a sintered metal body including a boss projecting from an end face thereof, said recess being formed in said boss, the area of said end face around said boss being spaced from the inner end of said bore whereby a shorter path for vented gas is provided from said recess radially through said boss into the space between the inner end of said bore and said area of the sintered metal body end face.

12. The apparatus of claim 11 including an insert positioned in said bore between said plug and said female mold part and having an aperture therethrough that defines a portion of said female mold part cavity adjacent said cavity end.

13. The apparatus of claim 10 including a first groove formed in and extending across said female mold part, a second groove formed in and extending across said porous plug, and a key positioned in both said grooves, whereby relative rotation of said plug and female mold part is restrained.

14. The apparatus of claim 10 wherein said bore has a diameter greater than the diameter of said cavity, said plug having an end face in which said recess is formed, and wherein an outer annular portion of said end face is spaced from the inner end of said bore to provide shorter transverse radial paths for gas vented from said cavity to the space between said female mold part and said plug.

* * * * *